United States Patent
Shih et al.

(10) Patent No.: US 8,924,745 B2
(45) Date of Patent: Dec. 30, 2014

(54) SIMULATION OF FIRST POWER GOOD SIGNAL TO GENERATE SECOND POWER GOOD SIGNAL BY POWER ENABLING CONTROL CIRCUIT FOR UNINTERRUPTED POWER SUPPLIES

(75) Inventors: Tsun-Te Shih, New Taipei (TW);
Yu-Yuan Chang, New Taipei (TW);
Kuang-Lung Shih, New Taipei (TW);
Po-Wen Hsiao, New Taipei (TW)

(73) Assignee: Zippy Technology Corp., New Taipei (TW)

( * ) Notice: Subject to any disclaimer, the term of this patent is extended or adjusted under 35 U.S.C. 154(b) by 260 days.

(21) Appl. No.: 13/444,457

(22) Filed: Apr. 11, 2012

(65) Prior Publication Data

US 2013/0275777 A1    Oct. 17, 2013

(51) Int. Cl.
*G06F 1/00* (2006.01)
*G06F 1/30* (2006.01)

(52) U.S. Cl.
CPC .................................. *G06F 1/30* (2013.01)
USPC ...................................................... 713/300

(58) Field of Classification Search
CPC ....... G06F 1/3203; G06F 1/26; G06F 1/3296; Y02B 60/1217; Y02B 60/1285
See application file for complete search history.

(56) References Cited

U.S. PATENT DOCUMENTS

| | | | | | |
|---|---|---|---|---|---|
| 4,860,185 | A | * | 8/1989 | Brewer et al. | 363/41 |
| 5,737,208 | A | * | 4/1998 | Chen | 363/133 |
| 5,978,236 | A | * | 11/1999 | Faberman et al. | 363/37 |
| 6,509,657 | B1 | * | 1/2003 | Wong et al. | 307/66 |
| 6,693,414 | B2 | * | 2/2004 | Ando | 323/303 |
| 2002/0099961 | A1 | * | 7/2002 | Billick et al. | 713/300 |
| 2009/0058187 | A1 | * | 3/2009 | Chang | 307/66 |
| 2011/0043043 | A1 | * | 2/2011 | Anupindi et al. | 307/66 |

* cited by examiner

*Primary Examiner* — Chun Cao
*Assistant Examiner* — Lin Lin Htay
(74) *Attorney, Agent, or Firm* — Muncy, Geissler, Olds & Lowe, P.C.

(57) ABSTRACT

A power enabling circuit for uninterrupted power supplies includes a main power supply system, a backup power supply system and a power enabling control circuit. The main power supply system is electrically connected to an external power source to convert and output a conversion power, and generates a first power good signal when the conversion power is output normally. The backup power supply system outputs a backup power when the main power supply system cannot output the conversion power. The power enabling control circuit receives the first power good signal output from the main power supply system and simulates to generate a corresponding second power good signal, and also includes a normal power supply state in which the second power good signal is sent to a motherboard and a backup power supply state to receive the backup power and continuously output the second power good signal to the motherboard.

10 Claims, 2 Drawing Sheets

SIMULATION OF FIRST POWER GOOD SIGNAL TO GENERATE SECOND POWER GOOD SIGNAL BY POWER ENABLING CONTROL CIRCUIT FOR UNINTERRUPTED POWER SUPPLIES

FIELD OF THE INVENTION

The present invention relates to an uninterrupted power supply and particularly to a power enabling circuit for an uninterrupted power supply.

BACKGROUND OF THE INVENTION

Because stable electric power is required for operation of all kinds of computer systems a power supply is needed to provide the stable power to meet this end. Most power supplies are connected to an input source to get input power and have a power conversion unit to convert the input power into a driving power sent to a load. Such a conventional structure often relies on the commercial power as the power input source. In the event that the commercial power cannot provide normally, the computer systems would be shut down, or the power supply driving the computer systems could be damaged due to overload of a boost unit. To prevent the problem caused by malfunction of a single input source, a conventional approach adopts an Uninterrupted Power System (UPS) connected to the power supply. In the event that the input source malfunctions, stable power still can be temporarily provided to drive the computer systems to reduce the risk of abrupt loss of the input power.

The computer systems supported by the aforesaid UPS power supply, such as the conventional computer systems, often comprise complex and precise electronic elements. To make sure that when the computer systems are started the internal power supplies thereof can provide sufficient power for all the electronic elements, the motherboard of each computer system outputs a power supply-on (PS-ON) signal to the power supply. When the power supply can output a stable voltage, it feeds back a power good signal (PGS) to the motherboard to facilitate downstream hardware inspection process, such as power-on self-test (POST). In the event that the power supply cannot provide a normal working voltage to the computer system, no PGS is sent to the motherboard, and the computer system cannot be started normally.

Output of the aforesaid PGS relies on the power supply to output the normal working voltage. However, in the event that the commercial power is not available, the motherboard still cannot receive the PGS to perform the normal booting procedure, and the UPS equipped in the computer system cannot function as desired.

SUMMARY OF THE INVENTION

The primary object of the present invention is to solve the problem of the conventional UPS computer system that cannot output a power good signal (PGS) to the motherboard when commercial power is not available and results in disability of performing normal booting procedure.

To achieve the foregoing object, the present invention provides a power enabling circuit for uninterrupted power supplies. It includes a main power supply system, a backup power supply system coupled in parallel with the main power supply system and a power enabling control circuit electrically connected to the main power supply system and backup power supply system. The main power supply system is electrically connected to an external power source to convert and output a conversion power, and generates a first PGS when the conversion power is output normally. The backup power supply system includes at least one energy storage module to store backup power and outputs the backup power when the main power supply system cannot output the conversion power. The power enabling control circuit receives the first PGS output from the main power supply system and performs simulation to generate a corresponding second PGS, and has a normal power supply state for sending the second PGS to a motherboard and also a backup power supply state to receive the backup power output from the backup power supply system and continuously send the second PGS to the motherboard.

In one embodiment the motherboard outputs a power supply-on (PS-ON) signal to the main power supply system and power enabling control circuit. The main power supply system receives the power supply-on (PS-ON) signal and delays for a first set duration to output the first PGS. The power enabling control circuit receives the power supply-on (PS-ON) signal and delays for a second set duration to output the second PGS.

In another embodiment the backup power supply system includes a charge unit to receive the conversion power and charge the conversion power into the energy storage module.

In yet another embodiment the power enabling control circuit includes an OFF state when it does not receive the power supply-on (PS-ON) signal from the motherboard.

In yet another embodiment the power enabling control circuit modulates synchronously the waveform of the second PGS according to the first PGS.

In yet another embodiment the main power supply system includes a rectification filter unit connected to the external power source, a power factor correction unit connected to the rectification filter unit, a transformer, a pulse width control unit, a switch element and a rectification output unit.

According to the power enabling circuit of the invention, when the main power supply system outputs the conversion power at a normal working voltage, it also outputs a first PGS to the power enabling control circuit which in turn simulates to output a corresponding second PGS to a motherboard to perform the following booting procedure. In the event that the main power supply system cannot output the conversion power normally, the backup power supply system provides a backup power; when the power enabling control circuit detects the backup power, it outputs continuously the second PGS to the motherboard to finish the booting procedure. The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
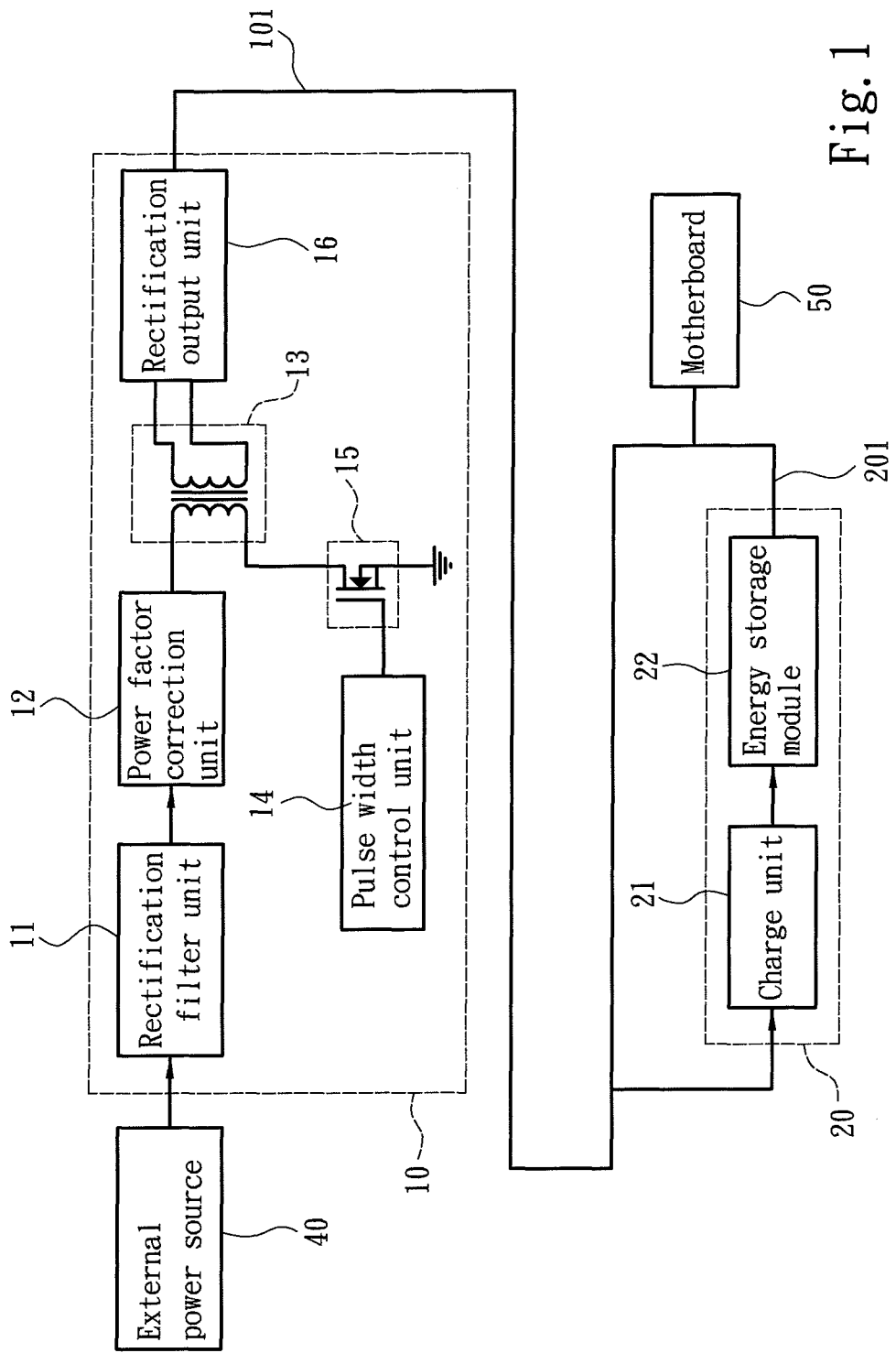
FIG. 1 is a schematic view of the fundamental circuit architecture of an embodiment according to the power enabling circuit of the invention.

Please refer to FIG. 1 for a schematic view of the fundamental circuit structure of an embodiment of the invention. The power enabling circuit for uninterrupted power supplies of the invention is adopted for use in a computer system which includes a motherboard 50 and a UPS power supply electrically connected to the motherboard 50. The motherboard 50 includes a central processing unit (CPU) and other electronic elements and circuit layouts. The UPS power supply, aside from providing electric power required for normal operation of the motherboard 50, also performs signal communication with the motherboard 50. The power enabling circuit of the invention includes a main power supply system 10 to output power to the motherboard 50 in normal conditions and a backup power supply system 20 to provide power to the motherboard 50 in the event that the main power supply system 10 cannot output the power normally.

In this embodiment, the main power supply system 10 includes a rectification filter unit 11 connected to an external power source 40, a power factor correction unit 12 connected to the rectification filter unit 11, a transformer 13, a pulse width control unit 14, a switch element 15 and a rectification output unit 16. The external power source 40 outputs AC power which passes through the rectification filter unit 11 and power factor correction unit 12. The power factor correction unit 12 regulates the power factor and voltage of the external power through an internal transformed voltage level. The pulse width control unit 14 determines the duty cycle of the switch element 15 to regulate coil current passing through the transformer 13. Finally, the rectification output unit 16 generates a conversion power 101 sent to the motherboard 50. The conversion power 101 is DC power. The backup power supply system 20 includes a charge unit 21 to receive the conversion power 101 converted and output by the main power supply system 10 and at least one energy storage module 22 to receive the conversion power 101 charged by the charge unit 21 and store as a backup power 201. The backup power supply system 20 outputs the backup power 201 to the motherboard 50 when the main power supply system 10 cannot output the conversion power 101. In this embodiment, the energy storage module 22 is a rechargeable battery.

Figure 2:
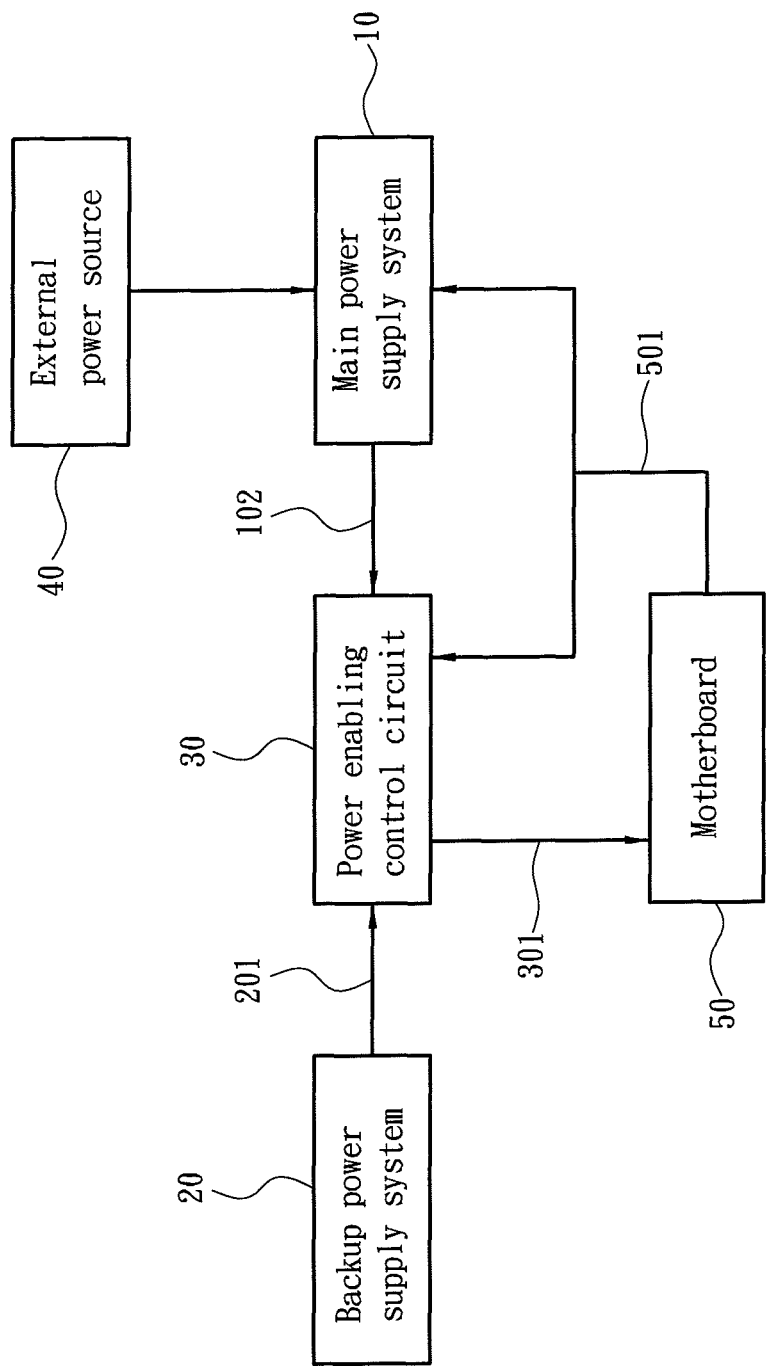
FIG. 2 is a circuit block diagram of an embodiment according to the power enabling circuit of the invention.

Please refer to FIG. 2 for a circuit block diagram of an embodiment according to the power enabling control circuit of the invention. The main power supply system 10 and backup power supply system 20 are electrically connected to a power enabling control circuit 30. The main power supply system 10 generates a first power good signal (PGS) 102 to the power enabling control circuit 30 when the conversion power 101 is output normally. The power enabling control circuit 30 receives the first PGS 102 and simulates to generate a corresponding second PGS 301. The power enabling control circuit 30 includes a normal power supply state to send the second PGS 301 to the motherboard 50 and a backup power supply state to receive the backup power 201 output from the backup power supply system 20 and continuously output the second PGS 301 to the motherboard 50.

In the invention, when a user starts the computer system, the motherboard 50 first outputs a power supply-on signal 501 to the main power supply system 10 and power enabling control circuit 30. After the main power supply system 10 has received the power supply-on signal 501, it delays for a first set duration (such as two seconds) to output the first PGS 102 to the power enabling control circuit 30. After the power enabling control circuit 30 has received the first PGS 102 output from the main power supply system 10 in the normal power supply state, it synchronously modulates and outputs a second PGS 301 to the motherboard 50 based on the first PGS 102. The second PGS 301 has a waveform the same as the first PGS 102. On the other hand, when the power enabling control circuit 30 has received the power supply-on signal 501, it first activates the backup power supply system 20 and then delays for a second set duration (such as two seconds) to output the second PGS 301 to the motherboard 50. In the event that the main power supply system 10 cannot normally provide the conversion power 101 to the motherboard 50, the power enabling control circuit 30 is in a backup power supply state and receives the backup power 201 output from the backup power supply system 20 to continuously output the second PGS 301 to the motherboard 50.

When the computer system is shut down, it stops sending the power supply-on signal 501 to the main power supply system 10 and power enabling control circuit 30. In the event that the power enabling control circuit 30 does not receive the power supply-on signal 501 from the motherboard 50, it does not output the second PGS 301 to the motherboard 50 so that the computer system can perform shutdown procedure.

As a conclusion, according to the power enabling circuit of the invention, when the main power supply system outputs the conversion power at a normal working voltage, it also sends a first PGS to the power enabling control circuit which further simulates to output a corresponding second PGS to the motherboard to perform the following booting procedure. When the main power supply system cannot normally output the conversion power, the backup power supply system provides a backup power; when the power enabling control circuit detects the backup power, it continuously outputs the second PGS to the motherboard to finish the booting procedure. As a result, no matter the main power supply system in the UPS power supply can function normally or not, the motherboard can get the PGS to finish the following booting procedure. It provides significant improvements over the conventional technique.

While the preferred embodiment of the invention has been set forth for the purpose of disclosure, it is not the limitation of the invention, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A power enabling circuit for uninterrupted power supplies, comprising:
a main power supply system which is electrically connected to an external power source to convert and output a conversion power and generates a first power good signal when the conversion power is output normally;
a backup power supply system which is coupled in parallel with the main power supply system and includes at least one energy storage module to store a backup power which is output from the backup power supply system when the main power supply system is unable to output the conversion power; and
a power enabling control circuit which is electrically connected to the main power supply system and the backup power supply system to receive the first power good signal output from the main power supply system and simulate to generate a corresponding second power good signal, and includes a normal power supply state for sending the second power good signal to a motherboard and a backup power supply state to receive the backup power output from the backup power supply system and continuously send the second power good signal to the motherboard.

2. The power enabling circuit of claim 1, wherein the motherboard outputs a power supply-on signal to the main power supply system and the power enabling control circuit.

3. The power enabling circuit of claim 2, wherein the main power supply system receives the power supply-on signal and delays for a first set duration to output the first power good signal.

4. The power enabling circuit of claim 2, wherein the power enabling control circuit receives the power supply-on signal and delays for a second set duration to output the second power good signal.

5. The power enabling circuit of claim 1, wherein the backup power supply system includes a charge unit to receive the conversion power and charge the conversion power into the energy storage module.

6. The power enabling circuit of claim 1, wherein the power enabling control circuit includes an OFF state in which no power supply-on signal is received from the motherboard.

7. The power enabling circuit of claim 1, wherein the power enabling control circuit synchronously modulates waveform of the second power good signal according to the first power good signal.

8. The power enabling circuit of claim 1, wherein the main power supply system includes a rectification filter unit connected to the external power source, a power factor correction unit connected to the rectification filter unit, a transformer, a pulse width control unit, a switch element and a rectification output unit.

9. The power enabling circuit of claim 1, wherein the conversion power of the main power supply system is DC power.

10. The power enabling circuit of claim 1, wherein the energy storage module is a rechargeable battery.

* * * * *